(12) United States Patent
Vedder et al.

(10) Patent No.: US 12,389,897 B2
(45) Date of Patent: Aug. 19, 2025

(54) METHOD FOR OPERATING AN AGRICULTURAL MACHINE AND AGRICULTURAL MACHINE

(71) Applicant: Kverneland Group Nieuw-Vennep B.V., Nieuw-Vennep (NL)

(72) Inventors: Gert-Jan Vedder, Ter Aar (NL); René Van Der Krogt, Nieuwerbrug (NL)

(73) Assignee: Kverneland Group Nieuw-Vennep B.V., Nieuw-Vennep (NL)

( * ) Notice: Subject to any disclaimer, the term of this patent is extended or adjusted under 35 U.S.C. 154(b) by 581 days.

(21) Appl. No.: 16/954,220

(22) PCT Filed: Nov. 30, 2018

(86) PCT No.: PCT/EP2018/083190
§ 371 (c)(1),
(2) Date: Jun. 16, 2020

(87) PCT Pub. No.: WO2019/120944
PCT Pub. Date: Jun. 27, 2019

(65) Prior Publication Data
US 2020/0367484 A1  Nov. 26, 2020

(30) Foreign Application Priority Data

Dec. 20, 2017 (EP) .................................... 17209029

(51) Int. Cl.
*A01M 7/00* (2006.01)
(52) U.S. Cl.
CPC ................. *A01M 7/0057* (2013.01)

(58) Field of Classification Search
CPC . A01M 7/0057; A01M 7/0053; F15B 21/008; F15B 1/021
See application file for complete search history.

(56) References Cited

U.S. PATENT DOCUMENTS

| 3,902,667 A | 9/1975 | Jackson |
| 4,427,154 A | 1/1984 | Mercil |

(Continued)

FOREIGN PATENT DOCUMENTS

| CN | 107242228 A | 10/2017 |
| EP | 1186233 A2 | 3/2002 |

(Continued)

OTHER PUBLICATIONS

International Search Report and Written Opinion dated Mar. 6, 2019 for Application No. PCT/EP2018/083190.

*Primary Examiner* — Tuongminh N Pham
(74) *Attorney, Agent, or Firm* — Leason Ellis LLP

(57) ABSTRACT

The present disclosure refers to a method for operating an agricultural machine, the agricultural machine having a boom horizontally extending, a balancing system balancing an orientation of the boom in operation, and a tension system adapted for applying pretension to the boom, in which the method includes: moving the agricultural application machine over soil; balancing the orientation of the boom by the balancing system; limiting or completely preventing balancing of the orientation of the boom by the balancing system, and keeping the boom in a pre-tensioned orientation by activating the tension system; and enabling balancing of the orientation of the boom by the balancing system by deactivating the tension system. Further, an agricultural machine is disclosed.

14 Claims, 3 Drawing Sheets

(56) References Cited

U.S. PATENT DOCUMENTS

Figure 1:
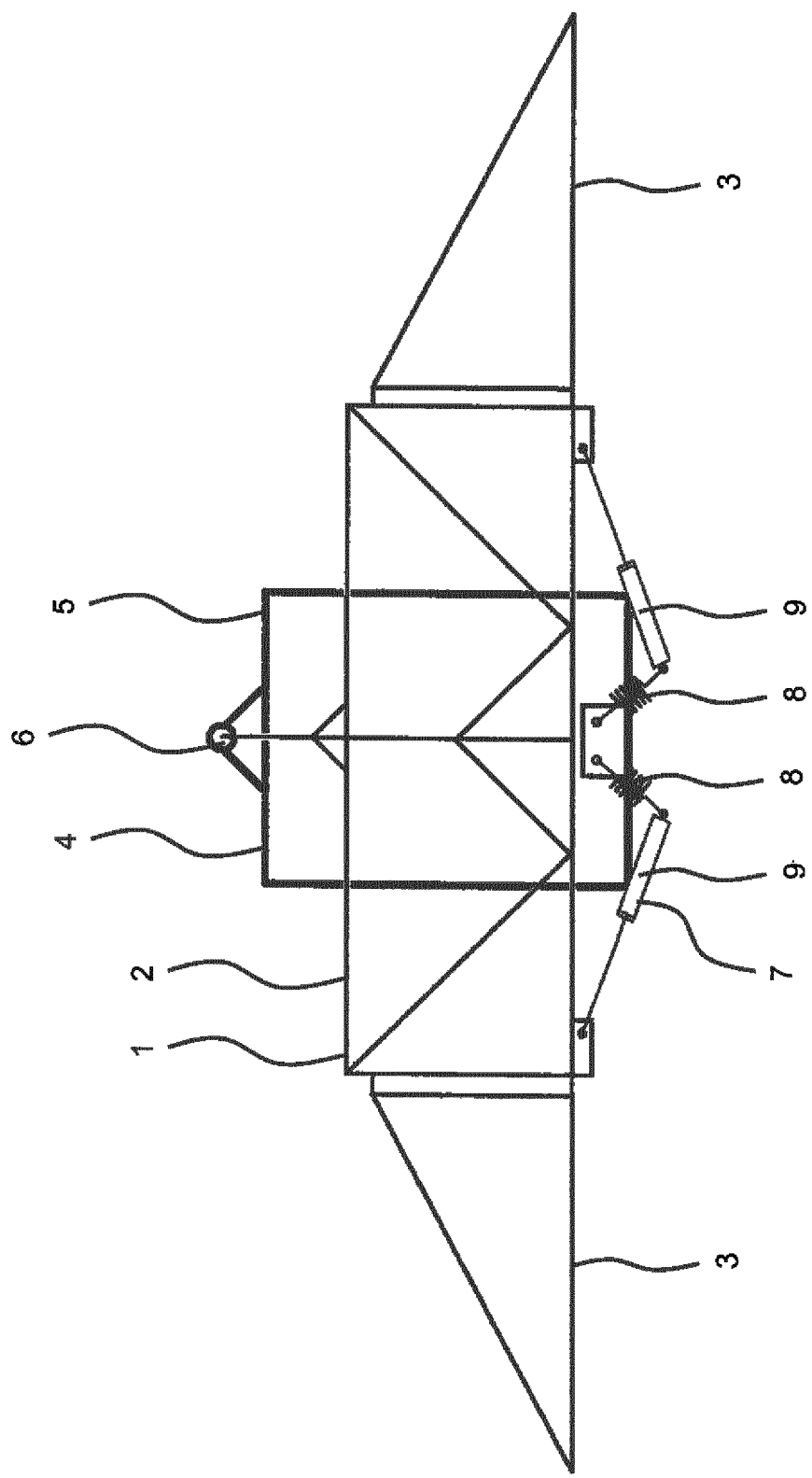

| | | | |
|---|---|---|---|
| 5,794,852 A | 8/1998 | Wald et al. | |
| 2004/0158381 A1* | 8/2004 | Strelioff | A01M 7/0057 340/440 |
| 2009/0312911 A1* | 12/2009 | Matthews | A01B 69/007 701/42 |
| 2012/0261146 A1* | 10/2012 | Bolten | A01B 69/004 172/280 |
| 2017/0020121 A1* | 1/2017 | Itou | A01M 7/0071 |

FOREIGN PATENT DOCUMENTS

| | | |
|---|---|---|
| EP | 2997822 A1 | 3/2016 |
| FR | 2427050 A1 | 12/1979 |
| FR | 2996412 A1 | 4/2014 |
| GB | 2534391 A | 7/2016 |
| RU | 2327327 C1 | 6/2008 |
| RU | 169798 U1 | 4/2017 |
| UA | 64750 A | 3/2004 |
| UA | 28026 U | 11/2007 |

\* cited by examiner

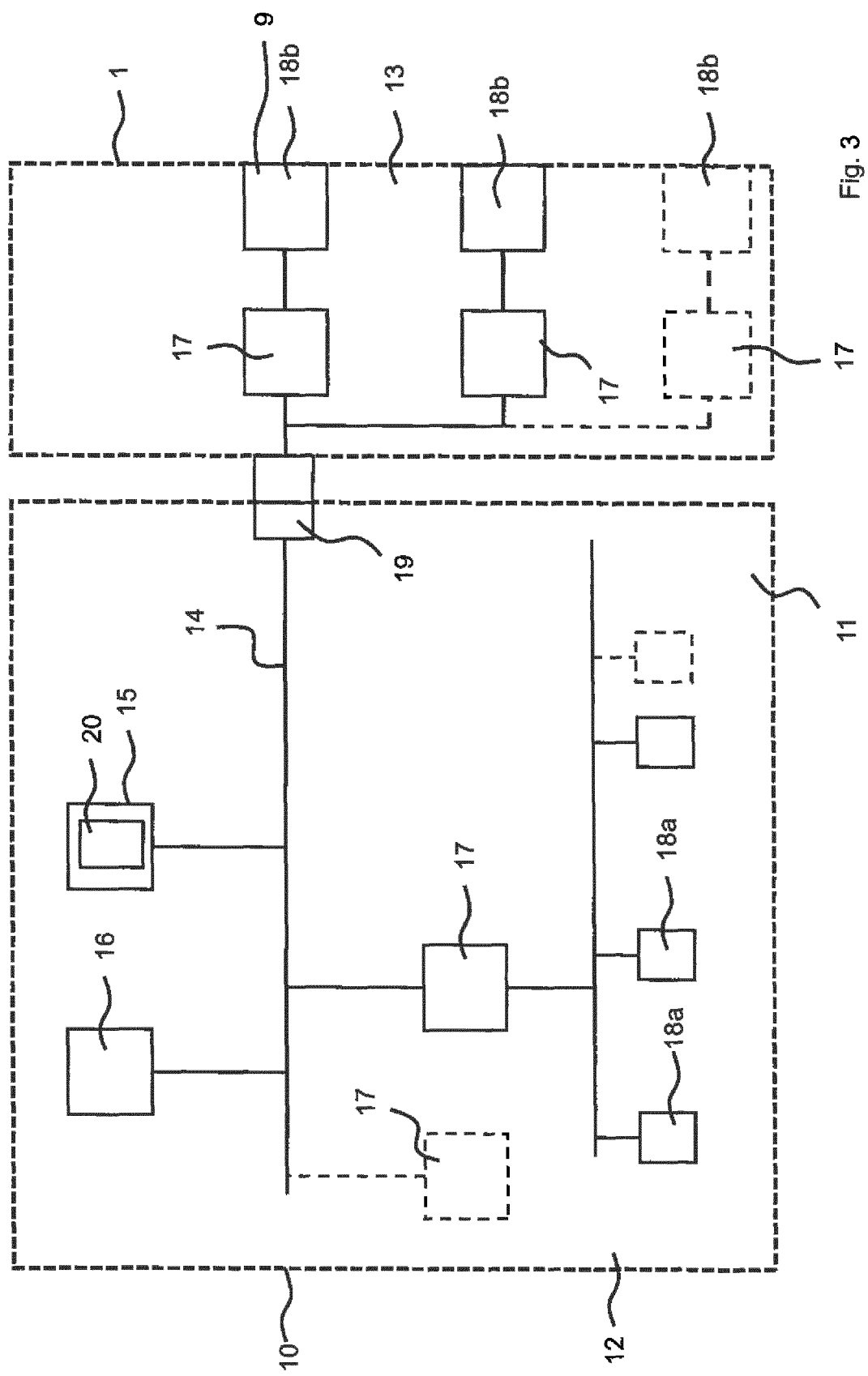

METHOD FOR OPERATING AN AGRICULTURAL MACHINE AND AGRICULTURAL MACHINE

CROSS-REFERENCE TO RELATED APPLICATIONS

This patent application is a national stage of International Application No. PCT/EP2018/083190. filed on Nov. 30, 2018, which claims the priority from European Application No. EP 17 209 029.2, filed Dec. 20, 2017, both of the aforementioned applications are hereby incorporated by reference in their entireties.

The present disclosure refers to a method for operating an agricultural machine and an agricultural machine.

BACKGROUND

For dispensing spray material, such as pesticides, herbicides, fungicides or fertilizer, on a field, an application machine may be provided by equipping a tractor with a boom from which such spray material is dispensed, for example via nozzles attached to the boom. Alternatively, a dedicated application machine may be provided with a boom from which spray material is dispensed. The application machine usually moves across the field in essentially straight lines, dispensing the spray material. When the application machine reaches the end of the field, it turns in the so-called headland in which the spray material may not be dispensed. Alternatively, when crops are planted on the headland, spraying on the headland is also needed. The main purpose of the headland is to turn the machine in the next 'tramline' or working path. Before turning, sprayer is usually turned off, but it might be that at the beginning or at the end of a spray application, the headland is being sprayed in a working path along the headland.

To ensure uniform dispensing and avoid damage to the boom, the boom may be equipped with a balance or balancing system for balancing the boom in a desired position, for example a horizontal position. For this, a movement of the boom relative to other components of the application machine may be permitted.

Lateral extension of common booms is considerable to allow dispensing of spray material over a wide area. When an application machine is turned in the headland, the lever provided by the boom may cause excessive movement of the boom and, therefore, instability. However, restricting movement of the boom to avoid instability may impede balancing, as the balancing movement of the boom relative to other components is restricted as well.

The document EP 1 186 233 A2 discloses a sprayer bar mounting for an agricultural sprayer comprising a tubular frame with lifting cylinder. The frame and sprayer bars are attached to a rotary mounting in the form of a turntable.

The document FR 2 996 412 A1 describes a device with an intermediate frame connected to a base frame by its pivot, and a suspended frame connected to the intermediate frame by pivot bearings. A hydraulic slope adjusting and damping device connects the intermediate and base frames to adjust a slope around the pivot and/or to dampen pivoting movement of the intermediate frame relative to the base frame. Springs are provided between stop screws of the intermediate and suspended frames to limit displacement of the suspended frame relative to the intermediate frame.

The document U.S. Pat. No. 4,427,154 A relates to a boom suspension and lift assembly which is mounted to extend laterally from a vehicle for agricultural spraying purposes. The boom assembly comprises a main frame mounted on the vehicle and at least one boom pivotally mounted on the main frame. A suspension system between each boom and the main frame independently absorbs boom motion resulting from vehicle travel over uneven terrain. A boom lifting system is provided to selectively lift each boom relative to the main frame by pivoting the boom about a longitudinal axis adjacent the main frame. For transport or storage, each boom is foldable against a side of the vehicle.

The document EP 2 997 822 A1 discloses a positioning system, for a boom having right and left boom arms. The system comprises a first actuator for moving the right boom arm relative to a support frame, a second actuator for moving the left boom arm relative to a support frame, a first hydraulic link between the first and second actuators, and a hydraulic control device for controlling movement of hydraulic fluid within the first hydraulic link, thereby controlling extension and/or retraction of the first and second actuators.

In the document CN 107 242 228 A, a boom sprayer which comprises a sprayer vehicle provided with a power driving system is disclosed.

SUMMARY

It is an object of the present disclosure to provide a method for operating an agricultural machine and an agricultural machine in which operation is better adapted to the different operation conditions while the agricultural machine is moving over soil.

For solving the object, a method for operating an agricultural machine according to claim 1 as well as an agricultural machine according to claim 15 are provided. Further embodiments are the subject of dependent claims.

According to an aspect, a method for operating an agricultural machine is provided, the agricultural machine having a boom horizontally extending, a boom balancing system balancing an orientation of the boom in operation, and a tension system adapted for applying pretension to the boom. The method comprises moving the agricultural machine over soil; balancing the orientation of the boom by the balancing system; limiting or completely preventing balancing of the orientation of the boom by the balancing system, and keeping the boom in a pre-tensioned orientation by activating the tension system, if a first moving condition is determined for the agricultural machine by the control unit; and enabling balancing of the orientation of the boom by the balancing system by deactivating the tension system, if a second moving condition is determined for the agricultural machine by the control unit, wherein the second moving condition is different from the first moving condition.

According to another aspect, an agricultural machine is provided, comprising a boom horizontally extending, a boom balancing system balancing an orientation of the boom in operation, a tension system configured to apply pre-tension to the boom, and a control unit coupling to the tension system for operating the tension system. The tension system is adapted to limit or completely prevent balancing of the orientation of the boom by the balancing system, and keeping the boom in a pre-tensioned orientation by activating the tension system; and enable balancing of the orientation of the boom by the balancing system by deactivating the tension system.

The agricultural machine may further comprise a control unit coupling to the tension system for operating the tension system. The method may comprise limiting or completely preventing balancing of the orientation of the boom by the balancing system, and keeping the boom in a pre-tensioned orientation by activating the tension system, if a first moving condition is determined for the agricultural machine by the control unit; and enabling balancing of the orientation of the boom by the balancing system by deactivating the tension system, if a second moving condition is determined for the agricultural machine by the control unit, wherein the second moving condition is different from the first moving condition.

The balancing of the boom may also be referred to as balancing movement of the boom caused by moving the agricultural machine over soil. In an embodiment, free or full balancing of the movement of the boom may be provided in case the second moving condition is determined (with respect to the tension system, untensioned moving condition applied to the boom). In contrast, limited balancing of the movement of the boom may be provided in case the first moving condition is determined (pre-tensioned moving condition applied to the boom). As an alternative, in case of determining the first condition balancing of the movement of the boom may be prevented by activating the tension system.

The balancing system may be configured to balance the position of the boom in a preferred orientation. The preferred orientation may be a horizontal orientation. For example, the balancing system may be configured to balance the orientation of the boom in the horizontal orientation when the agricultural machine is moved over areas of the soil inclined in respect to a horizontal plane.

At least one of the first moving condition and the second moving condition may be determined, by the control unit, in response to receiving a user input through a user input device. The user input may be received via any suitable user input device, such as a button or switch, a touchscreen, a microphone and/or a computer mouse, for example.

At least one of the first moving condition and the second moving condition may be determined, by the control unit, in response to an automatic control signal switching a mode of operation for a plurality of application elements provided on the boom. For example, at least one of the first moving condition and the second moving condition may be determined in response to an automatic control signal indicative of starting and stopping the dispensing of the spray material via the application elements, respectively. As an alternative or in addition, at least one of the first moving condition and the second moving condition may be determined in response to a control signal indicative of a driving condition. For example, the control signal may be determined based on steering information of the agricultural machine. In an embodiment, a control signal indicative of the first moving condition is generated based on steering information indicative of the agricultural machine driving in a curve, and a control signal indicative of the second moving condition is generated based on steering information indicative of the agricultural machine driving in a straight line.

Additionally or alternatively, at least one of at least one of the first moving condition and the second moving condition may be determined based on sensor information. For example, an acceleration sensor and/or an angle sensor may be provided on the agricultural machine. Based on sensor information from the acceleration sensor(s), movement patterns of the agricultural machine indicative of the first moving condition, such as driving a curve, may be identified and, based on the movement patterns, the first moving condition may be determined. The second moving condition may be determined accordingly.

At least one of the first moving condition and the second moving condition may be determined, by the control unit, in response to a position signal indicative of the position of the agricultural machine. For example, a position signal indicative of the position of the agricultural machine may be determined using the global positioning system (GPS). Additionally or as an alternative, the sensor information such as acceleration sensor information may be used for determining a position signal indicative of the position of the agricultural machine. Map information may be provided and used for determining a position signal indicative of the position of the agricultural machine and/or for determining movement in the headland area and/or movement in the non-headland area based on the position signal indicative of the position of the agricultural machine. Map information may be used in conjunction with sensor information to determine the position signal and/or at least one of the first moving condition and the second moving condition.

A control signal indicative to switching to, a headland mode of operation and/or a control signal indicative to switching to a non-headland mode of operation may be provided, the headland mode of operation being a mode of operation for movement of the agricultural machine in the headland area of the soil and the non-headland mode being a mode of operation for movement of the agricultural machine in the non-headland area of the soil. In an embodiment, a user input may be received via a headland mode activation button. The headland mode activation button may be provided, for example, as a hardware button or as a software button on a touch screen. Using the headland mode activation button, the user may toggle between the headland mode of operation and the non-headland mode of operation. Alternatively, a control signal indicative to switching to a headland mode of operation and/or a control signal indicative to switching to a non-headland mode of operation may be provided without receiving a user input, for example automatically. In an embodiment, a control signal indicative to switching to a headland mode of operation and/or a control signal indicative to switching to a non-headland mode of operation are provided in response to determining movement in the headland area and/or movement in the non-headland area, respectively.

The activating of the tension system may further comprise activating a spring member for applying pre-tension to the boom. The spring member may comprise a helical coil spring. Alternatively or additionally, the spring member may comprise other types of springs, such as torsion springs. The spring member may comprise more than one spring. Activating a spring member may comprise tensioning the spring member, and deactivating the spring member may comprise untensioning the spring member. The spring member may be tensioned and untensioned in response to switching a mode of operation. For example, the spring member may be tensioned in response to switching to a headland mode of operation, and the spring member may be untensioned in response to switching to a non-headland mode of operation.

With regard to the spring member, it may comprise an elastic chain and/or a chain coupled to a damping element for providing the The activating of the spring member may further comprise activating an actuator functionally coupled to the spring member. The actuator may comprise a hydraulic cylinder. Activating the spring member may comprise tensioning the spring member by a movement of the piston of the hydraulic cylinder into the cylinder barrel. Deactivating the spring member may comprise untensioning the spring member by a movement of the piston of the hydraulic cylinder out of the cylinder barrel. Alternatively or additionally, other types of actuators may be applied. For example, a linear electrical motor may be used for activating the spring member. In another embodiment, a rotational electrical motor is provided and the rotary movement may be mechanically converted into a linear movement for activating the spring member.

The keeping of the boom in the pre-tensioned orientation may further comprise securing the boom in an elevated position. The elevated position may be elevated compared to a working position or orientation of the boom in which the boom is balanced when it is not in the pretensioned position. The working position may be a position of the boom when the agricultural machine is in operation. For example, the working position may be a position in which the spray substance is dispensed while the agricultural machine is moving over the non-headland area of the soil. The boom may then be raised to an elevated position when the agricultural machine enters the headland area of the soil and secured in the elevated position during movement of the agricultural machine in the headland area.

Balancing of the boom may be a mechanical balancing. For example, the boom balancing system may be provided with mechanical elements for balancing the boom in a desired position in varying operation conditions.

The balancing of the orientation of the boom may further comprise gravity-balancing of the boom. Gravity-balancing of the boom may comprise balancing the boom at least in part under the influence of gravity. For example, the boom may be self-balancing under the influence of gravitational force. In an embodiment, gravitational force on components of the boom may cause movement of these or other components, resulting in the balancing of the boom. For self-balancing of the boom, free movement of components of the boom may be possible. For example, one or more components may freely rotate to allow for balancing movement under the influence of gravitational force. Alternatively or in addition to self-balancing, balancing of the position of the boom may comprise forced balancing. For example, actuators may be provided for balancing. Forced balancing may comprise gravity-balancing. In an embodiment, gravitational force is measured, for example by a sensor, and, for balancing, actuators are actuated according to the gravitational force measured.

The applying of the pre-tension to the boom may further comprise applying the pre-tension to a middle section of the boom. The boom may be provided with a middle section and outer boom sections mounted to the middle section. The outer boom sections may be extendable and retractable. For example, the outer boom sections may be extended in an active operation mode for dispensing the spray material and the outer boom sections may be retracted when the active operation mode is deactivated.

In an embodiment, a middle section of the boom is supported on a boom mounting assembly which is mounted to a chassis of the agricultural machine. For balancing, the middle section may be movable, with at least one degree of freedom, with respect to the boom mounting assembly. For example, the middle section may be rotatable with respect to the boom mounting assembly. The outer boom sections may not perform any balancing movement relative to the middle section. In such embodiment, the outer boom sections may perform other movements than a balancing movement relative to the middle section. In an alternative embodiment, the outer boom sections may perform balancing movements relative to the middle section. The middle section itself may also perform balancing movements or may not perform balancing movements.

Applying the pre-tension to the middle section of the boom may comprise applying the pretension between the mounting assembly and the middle section of the boom. The tension system may be coupled to the middle section of the boom and the mounting assembly to apply the pre-tension between the middle section of the boom and the mounting assembly. For example the spring member and the actuator may be functionally connected to each other provided in the tension system and the tension system may connect to the middle section of the boom on one side of the tension system and to the mounting assembly on the opposite side of the tension system.

In an embodiment, the following may be provided: the determining the first moving condition comprises determining movement of the agricultural machine in a headland area; and the determining the second moving condition comprises determining movement of the agricultural machine in a non-headland area.

In another embodiment, the following may be provided: the determining the first moving condition comprises determining a steering angle of a steering device of the agricultural machine being above a threshold angle value; and the determining the second moving condition comprises determining the steering angle of the steering device of the agricultural machine being below the threshold angle value.

In still another embodiment, the following may be provided: the determining the first moving condition comprises determining a speed of movement of the agricultural machine being above a threshold speed value; and the determining the second moving condition comprises determining the speed of movement of the agricultural machine being below the threshold speed value.

According to the technology disclosed herein, balancing of the position or orientation of the boom by the balancing system is limited or completely prevented by activating the tension system. Thereby, different degrees of limitation of balancing of the position of the boom may be provided.

Limiting balancing of the position of the boom by the balancing system may comprise allowing some balancing of the position of the boom, but limiting the balancing in comparison to balancing of the position of the boom that is enabled if it is determined that the agricultural machine is moving in a non-headland area of the soil. For example, enabling balancing of the position of the boom may comprise allowing rotation of the boom within an angular range. Limiting balancing of the position of the boom may then comprise allowing rotation of the boom within an angular range that is reduced in comparison to the angular range in which rotation is allowed when balancing of the position of the boom is enabled. Alternatively or additionally, limiting balancing of the position of the boom may comprise reducing a balancing sensitivity. For example, an external force necessary to cause a balancing movement when balancing of the position of the boom is limited may be greater than an external force necessary to cause a balancing movement when balancing of the position of the boom is enabled.

Completely preventing balancing of the position of the boom by the balancing system may also be referred to as blocking of the balancing of the position of the boom. When balancing is blocked, there is no balancing of the position of the boom, i.e. any balancing movement of the boom is prevented.

The second moving condition may be indicative of the first moving condition being not present anymore.

In case the boom is provided with opposite outer boom sections extending to opposite sides, e.g. to opposite sides from a middle boom section, the tension system may be connected to one or both outer boom sections, thereby, applying the pre-tension to only one of the outer boom sections or to both. Similarly, the tension system may be connected to only one or to more than one boom sections if the boom is provided with a plurality of boom sections.

The control unit may be provided in a control system. For example, the control unit may be provided in an ISOBUS system, such as a machine control network implementing the ISO 11683-11 standard.

The embodiments disclosed above with regard to the method for operating an agricultural machine may apply to the agricultural machine, mutatis mutandis.

The agricultural machine may further comprise a control unit coupling to the tension system for operating the tension system, wherein the control unit is adapted to, while the agricultural machine is moving over soil, limit or completely prevent balancing of the orientation of the boom by the balancing system, and keep the boom in a pre-tensioned orientation by activating the tension system, if a first moving can be condition is determined for the agricultural machine by the control unit; and enable balancing of the orientation of the boom by the balancing system by deactivating the tension system, if a second moving condition is determined for the agricultural machine by the control unit, wherein the second moving condition is different from the first moving condition.

The tension system may be adapted to be activated and/or deactivated in response to a position change of the boom, e.g. due to lifting. For example, a mechanical or coupling mechanism may be provided adapted to activate the tension system in response to lifting or lowering the boom to a changed position from a starting position. The mechanical mechanism provided with one or more mechanical members may couple to a frame supporting the boom. By lifting up the frame the activation of the tension system may be initiated through the mechanical or coupling mechanism. Through the mechanical or coupling mechanism the tension system may be forced to be activated. Also, the mechanical or coupling mechanism may cause or force the tension system to be deactivated, e.g. because of another change of boom position.

The tension system may be operated by a connection with a boom lifting structure/assembly or a main frame of the machine, i.e. connection with a steel cable. The tensioning system may be activated by lifting the boom, e.g. in a headland area. Lifting the boom may be done by a control unit assigned to the boom lifting structure/assembly or a main frame. There would-be still (indirect) activation/deactivation of the tension system by (a different) control unit operationally coupled to the mechanical mechanism, for example, through the lifting structure or assembly configured to lift and lower the boom. Alternatively, the tension system may be activated/deactivated manually by the user, for example, by manually tensioning one or more spring members.

The agricultural machine may be an agricultural application machine, for example, configured to move over ground or soil, such as a field, for dispensing a spray material onto the ground or soil. The agricultural application machine may be a sprayer. A plurality of application elements may be provided on the boom. The application elements may comprise a nozzle provided on the boom and configured to dispense the spray material.

Dispensing the spray material onto the ground may comprise dispensing the spray material onto the soil or ground, for example of a field, or onto plants growing thereon. The spray material to be dispensed may, for example, be a pesticide, a fungicide, an herbicide or a fertilizer to be sprayed onto the soil.

DESCRIPTION OF FURTHER EMBODIMENTS

Figure 2:
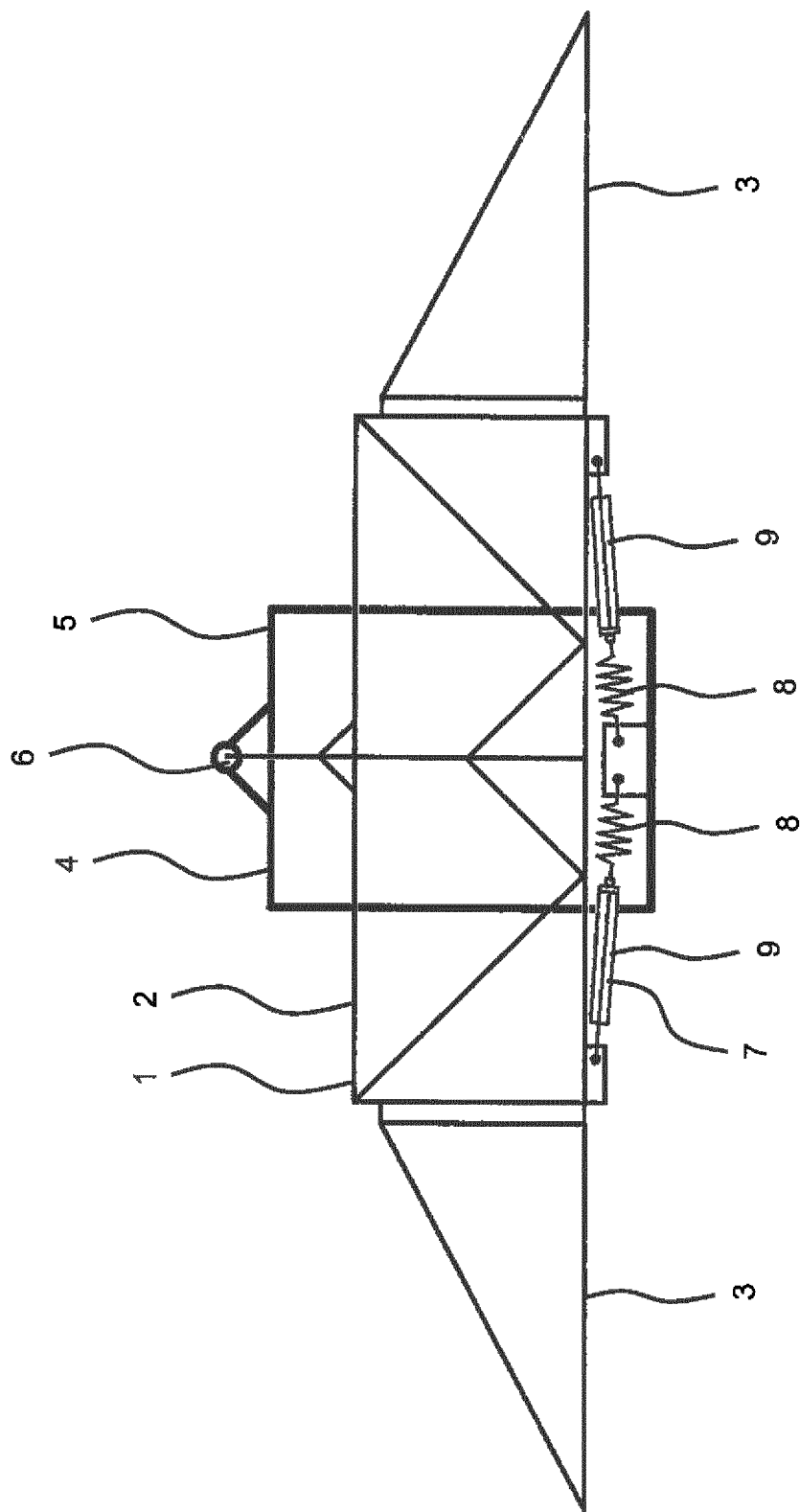

Following, embodiments, by way of example, are described with reference to figures. In the figures show:

FIG. 1 a schematic representation of an agricultural machine in which a tension system is deactivated;

FIG. 2 a schematic representation of the agricultural machine of FIG. 1 in which a tension system is activated; and FIG. 3 a schematic representation of a control system of an agricultural system.

FIG. 1 shows a schematic representation of an agricultural machine with a boom 1. The agricultural machine may be an agricultural application machine which is configured to move over ground or soil, such as a field, to dispense, by a plurality of application elements provided on the boom 1, a spray material onto the ground or soil. The boom 1 comprises a middle section 2 and outer sections 3 mounted on the middle section 2 and extending outwards horizontally. For dispensing the spray material, a plurality of application elements (not shown), such as nozzles, are provided on the outer sections 3 of the boom 1.

The agricultural machine further comprises a boom balance system 4 for balancing an orientation or a position of the boom 1 in operation. The agricultural machine, for example, may be provided with a tractor and an implement or with a self-propelling machine.

The balancing system 4 may also be referred to as balancing movement of the boom 1 in operation. The middle section 2 of the boom 1 is supported on the boom mounting assembly 5 of the boom balance or balancing system 4. For balancing, the middle section 2 of the boom 1 moves relative to the boom mounting assembly 5 of the boom balance system 4. In the embodiment shown, a rotation of the boom 1 around a longitudinal axis of the agricultural machine is possible for balancing the boom 1 to ensure a horizontal orientation of the outward-extending outer sections 3 of the boom 1, for example when the agricultural machine is moving on an inclined surface. The boom 1 rotates around pivot point 6, through which the longitudinal axis passes, relative to the boom mounting assembly 5 of the boom balancing system 4. The boom may rotate not only around point 6, but also the two short pendulums are in between. Therefore, more than one rotation axes may be provided for the boom 1.

The balance system 4 may be configured for gravity-balancing of the boom. For example, gravitational pull on the components of the boom 1 may keep the boom 1 in a horizontal position resulting in a relative movement between the middle section 2 of the boom 1 and the boom mounting assembly 5 when the agricultural machine moves out of a horizontal position, for example during movement on an inclined ground. Additionally or alternatively, forced balancing may be provided. Forced balancing may comprise active movement, for example using actuators, of the middle section 2 of the boom 1 relative to the boom mounting assembly 5. For forced balancing, sensors may be provided for detecting orientation of the boom and/or other components of the agricultural machine and/or for detecting other parameters, such as environmental parameters, for example an inclination of the ground the agricultural machine is moving on. The sensor signals may be processed to provide forced balancing.

The agricultural machine further comprises a tension system 7 which comprises spring members 8, which in the embodiment shown are helical springs, and actuators 9, which in the embodiment shown are hydraulic cylinders. The tension system 7 is provided between the boom mounting assembly 5 and the middle section 2 of the boom 1. In the embodiment shown, each of the spring members 8 is movably attached to the boom mounting assembly 5 on one side and to a hydraulic cylinder 9 on the other side. Each of the hydraulic cylinders 9 is movably attached to the middle section 2 of the boom 1.

In the representation of FIG. 1, the tension system 7 is not activated. The hydraulic cylinders 9 are in an extended position and the spring members 8 are not tensioned. When the tension system 7 of the agricultural machine is activated, as can be seen in the schematic representation in FIG. 2, the hydraulic cylinders 9 move into a retracted position, thereby tensioning the spring members 8. This may be referred to as a pre-tensioned position of the boom 1. The tension in the respective connections between the boom mounting assembly 5 and the middle section 2 of the boom 1 via a spring member 8 and a hydraulic cylinder 9 limits the balancing of the position or orientation of the boom by the balancing system by providing a counterforce to such movement.

In the embodiment shown in FIGS. 1 and 2, the tension system 7 comprises spring members 8 and hydraulic cylinders 9. In alternative embodiments, the tension system 7 may comprise any component or combination of components suitable to limiting or completely preventing balancing of the boom by the balancing system and keeping the boom in a pre-tensioned position or orientation. For example, other types of actuators 9 than hydraulic cylinders may be provided, such as electric motors. Additionally or as an alternative, a pneumatic cylinder may perform the functions of both a spring member and an actuator.

Keeping the boom 1 in a pre-tensioned orientation may comprise securing the boom 1 in an elevated position. For example, the boom 1 may be raised out of an operation position when the tension system 7 is activated. In an exemplary embodiment (not shown), spring members 8 of the tension system 7 execute a force on each of the outer sections 3 of the boom 1 when the tension system 7 is activated, thereby raising the outer sections 3 into an elevated position with regard to an operation position of the outer sections 3 during dispensing of the spray material.

FIG. 3 shows a schematic representation of an agricultural system or agricultural machine having a tractor 10 and a boom 1 carried on the tractor 10. In an alternative embodiment, there may be a self-propelling machine (not shown).

An agricultural machine control network 11 provides for an electronic control system of the agricultural system. The agricultural machine control network 11 comprises a tractor control network 12 and a boom control network 13. The agricultural system control network 11 is having a data bus 14 to which, according to the embodiment shown, a user control terminal 15, a task controller 16, and a plurality of electronic control units 17 are connected. Each of the electronic control units 17 is assigned to a functional element 18a, 18b provided in the tractor 10 or the boom 1, respectively. In an alternative embodiment, the electronic control units 17 connected to the user control terminal 15 through the data bus 14 may only be applied to the functional element(s) 18b of the boom 1, but not to the functional element(s) 18a of the tractor 10.

With regard to the boom 1, the functional elements 18b may also be referred to as working or functional units. Through the data bus 14, electronic data may be transmitted between the components, units, modules or elements connected to the data bus 14. The electronic control system of the agricultural machine control network 11 may implement the ISO 11683 standard, preferably the ISO 11683-11 standard.

The data bus 14 is provided with a plug connector 19 connecting the tractor control network 12 and the boom control network 13.

The user or operator control terminal 15 is provided with a terminal display 20 and provides for user control and user display. Further, the user control terminal 15 is provided with a processor unit comprising a processor and a memory element connected to the processor. Multiple software applications implemented on the user terminal may be running simultaneously.

Through the user control terminal 15, user input may be received for controlling the functional elements 18a, 18b of the agricultural system. Also, through the terminal display 20, operation information may be displayed to the user.

In the embodiment of FIG. 3, one of the functional elements 18b of the boom 1 is a hydraulic cylinder 9 of a tension system 7 of the boom 1. The agricultural machine control network 11 may be referred to as a control device of the agricultural machine. If, for the agricultural machine, a first moving condition is determined, e.g. moving in a headland area, an activation control signal is provided, via the data bus 14 to the control unit 17 of the hydraulic cylinder 9. In response to the activation control signal, the piston of the hydraulic cylinder 9 is retracted into the barrel of the hydraulic cylinder 9, thereby activating the tension system 7. The boom 1 is thereby kept in a pre-tensioned position or orientation and balancing the boom 1 by the balancing system 4 is limited. If, for the agricultural machine, a second moving condition is determined, e.g. moving in a non-headland area, a deactivation control signal is provided, via the data bus 14 to the control unit 17 of the hydraulic cylinder 9. In response to the deactivation control signal, the piston of the hydraulic cylinder 9 is extended out of the barrel of the hydraulic cylinder 9, thereby deactivating the tension system 7. Balancing of the position of the boom 1 by the balancing system 4 is enabled, i.e. not limited, in this position.

In an embodiment, the first moving condition, e.g. movement of the agricultural machine in a headland area, is determined in response to receiving a user input. For example, a button may be provided in the control terminal 15 for a user input indicating movement in a headland area. Such button may be provided, for example, as a hardware button. Alternatively, such button may be provided as a software button, for example on a touchscreen of the control terminal 15. Alternatively or additionally, the second moving condition, e.g. movement of the agricultural machine in a non-headland area, may be determined in response to receiving a user input, for example, via a button provided in the control terminal 15 for a user input indicating movement in a non-headland area. Such button may be provided, for example, as a hardware button or a software button. Movement of the agricultural machine in the headland area and movement of the agricultural machine in the non-headland area may be determined via the same user input, each time the user input is provided being indicative of a switch from movement in the headland area to movement in the non-headland area and vice versa.

In a further embodiment, at least one of the first moving condition and the second moving condition, such as movement in the headland area and movement in the non-headland area, is determined based on an automatic control signal switching a mode of operation for a plurality of application elements provided on the boom. For example, movement in the non-headland area may be determined when dispensing of a spray material is started and movement in the headland area may be determined when dispensing of the spray material by the application elements is stopped.

In another embodiment, at least one of movement in the headland area and movement in the non-headland area is determined in response to a position signal indicative of the position of the agricultural machine. For example, a GPS unit may be provided in the agricultural machine to determine a position signal indicative of the position of the agricultural machine using the global positioning system (GPS). The GPS unit may be provided in the tractor 10 and/or the boom 1 and the position signal may be transmitted via the data bus 14.

In embodiments, in response to determining at least one of the first moving condition and the second moving condition, a headland mode of operation and/or a non-headland mode of operation may be activated, respectively. In response to activation of the headland mode of operation, headland mode control signals may be provided via the data bus 14 to the control units 17 assigned to functional elements 18a, 18b to operate the functional elements 18a, 18b according to the headland mode of operation. The headland mode control signals may comprise the activation control signal so that the piston of the hydraulic cylinder 9 is retracted into the barrel of the hydraulic cylinder 9, thereby activating the tension system 7. In response to activation of the non-headland mode of operation, non-headland mode control signals may be provided via the data bus 14 to the control units 17 assigned to functional elements 18a, 18b to operate the functional elements 18a, 18b according to the non-headland mode of operation. The non-headland mode control signals may comprise the deactivation control signal so that the piston of the hydraulic cylinder 9 is extended out of the barrel of the hydraulic cylinder 9, thereby deactivating the tension system 7.

The features disclosed in this specification, the figures and/or the claims may be material for the realization of various embodiments, taken in isolation or in various combinations thereof.

The invention claimed is:

1. A method for operating an agricultural machine, the agricultural machine having a boom horizontally extending, a balancing system balancing an orientation of the boom in operation, and a tension system adapted for applying pre-tension to the boom, the method comprising:
    moving the agricultural machine over soil;
    balancing the orientation of the boom by the balancing system;
    limiting or completely preventing balancing of the orientation of the boom by the balancing system, and keeping the boom in a pre-tensioned orientation by activating the tension system, thereby, applying a pre-tensioned moving condition to the boom, wherein activating the tension system comprises tensioning a spring member for applying pre-tension to the boom, wherein the spring member is tensioned when it is under a load and thereby deformed; and
    enabling balancing of the orientation of the boom by the balancing system by deactivating the tension system, thereby, applying an untensioned rotational moving condition to the boom, wherein deactivating the tension system comprises untensioning the spring member entirely, wherein the spring member is untensioned when there is no load upon the spring member and it is thereby undeformed.

2. The method according to claim 1, wherein the agricultural machine is further having a control unit coupling to the tension system for operating the tension system, the method further comprising:
    limiting or completely preventing balancing of the orientation of the boom by the balancing system, and keeping the boom in a pre-tensioned orientation by activating the tension system, if a first moving condition is determined for the agricultural machine by the control unit; and
    enabling balancing of the orientation of the boom by the balancing system by deactivating the tension system, if a second moving condition is determined for the agricultural machine by the control unit, wherein the second moving condition is different from the first moving condition.

3. The method according to claim 1, wherein the balancing system is configured to balance the orientation of the boom in a preferred orientation.

4. The method according to claim 2, further comprising determining, by the control unit, at least one of the first moving condition and the second moving condition in response to receiving a user input through a user input device.

5. The method according to claim 2, further comprising determining, by the control unit, at least one of the first moving condition and the second moving condition in response to an automatic control signal switching a mode of operation for a plurality of application elements provided on the boom.

6. The method according to claim 2, further comprising determining, by the control unit, at least one of the first moving condition and the second moving condition in response to a position signal indicative of the position of the agricultural machine.

7. The method according to claim 1, wherein the tensioning of the spring member further comprises activating an actuator functionally coupled to the spring member.

8. The method according to claim 1, wherein the keeping of the boom in the pre-tensioned orientation further comprises securing the boom in an elevated position.

9. The method according to claim 1, wherein the balancing of the orientation of the boom further comprises gravity-balancing of the boom.

10. The method according to claim 1, wherein the applying of the pre-tension to the boom further comprises applying the pre-tension to a middle section of the boom.

11. The method according to claim 2, wherein
    the determining the first moving condition comprises determining movement of the agricultural machine in a headland area; and
    the determining the second moving condition comprises determining movement of the agricultural machine in a non-headland area.

12. The method according to claim 2, wherein
    the determining the first moving condition comprises determining a steering angle of a steering device of the agricultural machine being above a threshold angle value; and the determining the second moving condition comprises determining the steering angle of the steering device of the agricultural machine being below the threshold angle value.

13. The method according to claim 2, wherein
the determining the first moving condition comprises determining a speed of movement of the agricultural machine being above a threshold speed value; and
the determining the second moving condition comprises determining the speed of movement of the agricultural machine being below the threshold speed value.

14. A method for operating an agricultural machine, the agricultural machine having a boom horizontally extending, a balancing system balancing an orientation of the boom in operation, and a tension system adapted for applying pre-tension to the boom,
the method comprising:
moving the agricultural machine over soil;
balancing the orientation of the boom by the balancing system;
limiting or completely preventing balancing of the orientation of the boom by the balancing system, and keeping the boom in a pre-tensioned orientation by activating the tension system, thereby, applying a pre-tensioned moving condition to the boom, wherein activating the tension system comprises tensioning a spring member for applying pre-tension to the boom, wherein the spring member is tensioned when it is deformed under a load; and
enabling balancing of the orientation of the boom by the balancing system by deactivating the tension system, thereby, applying an untensioned rotational moving condition to the boom, wherein deactivating the tension system comprises untensioning the spring member entirely, and wherein the spring member is untensioned when there is no load upon the spring member and it is thereby undeformed,
wherein the agricultural machine is further having a control unit coupling to the tension system for operating the tension system, the method further comprising:
limiting or completely preventing balancing of the orientation of the boom by the balancing system, and keeping the boom in a pre-tensioned orientation by activating the tension system, if a first moving condition is determined for the agricultural machine by the control unit; and
enabling balancing of the orientation of the boom by the balancing system by deactivating the tension system, if a second moving condition is determined for the agricultural machine by the control unit, wherein the second moving condition is different from the first moving condition.

* * * * *